(12) United States Patent
Wilkinson et al.

(10) Patent No.: US 7,966,659 B1
(45) Date of Patent: Jun. 21, 2011

(54) DISTRIBUTED LEARN MODE FOR CONFIGURING A FIREWALL, SECURITY AUTHORITY, INTRUSION DETECTION/PREVENTION DEVICES, AND THE LIKE

(75) Inventors: John Wilkinson, Hudson, OH (US); Brian A. Batke, Novelty, OH (US); Kenwood H. Hall, Hudson, OH (US); Tary J. Jasper, South Euclid, OH (US); Michael D. Kalan, Highland Heights, OH (US); James B. Vitrano, South Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1071 days.

(21) Appl. No.: 11/379,111

(22) Filed: Apr. 18, 2006

(51) Int. Cl.
*G06F 21/00* (2006.01)
(52) U.S. Cl. .......... 726/22; 726/11; 726/23; 726/25
(58) Field of Classification Search .......... 726/11, 726/22, 23, 25
See application file for complete search history.

(56) References Cited

U.S. PATENT DOCUMENTS

| | | | |
|---|---|---|---|
| 5,802,178 A | | 9/1998 | Holden et al. |
| 7,159,237 B2 * | | 1/2007 | Schneier et al. ............ 726/3 |
| 7,565,692 B1 * | | 7/2009 | Arturo ............................ 726/23 |
| 2001/0047474 A1 | | 11/2001 | Takagi et al. |
| 2002/0009185 A1 | | 1/2002 | Tung |
| 2002/0049899 A1 | | 4/2002 | Kenworthy |
| 2003/0051026 A1 * | | 3/2003 | Carter et al. ................ 709/224 |
| 2004/0030927 A1 | | 2/2004 | Zuk |
| 2004/0107345 A1 * | | 6/2004 | Brandt et al. ................ 713/171 |
| 2004/0158738 A1 | | 8/2004 | Tanaka |
| 2004/0181690 A1 | | 9/2004 | Rothermel et al. |
| 2005/0097364 A1 * | | 5/2005 | Edeki et al. ................ 713/201 |
| 2005/0144475 A1 | | 6/2005 | Sakaki et al. |
| 2005/0210291 A1 | | 9/2005 | Miyawaki et al. |
| 2005/0283536 A1 | | 12/2005 | Swanson et al. |
| 2006/0155865 A1 * | | 7/2006 | Brandt et al. ................ 709/230 |
| 2006/0294579 A1 * | | 12/2006 | Khuti et al. ................ 726/3 |
| 2007/0226781 A1 * | | 9/2007 | Chen et al. ................ 726/4 |

* cited by examiner

*Primary Examiner* — Edan Orgad
*Assistant Examiner* — Bradley Holder
(74) *Attorney, Agent, or Firm* — Turocy & Watson LLP; R. Scott Speroff; John M. Miller

(57) ABSTRACT

Techniques for system wide analysis of industrial protocol traffic are provided to determine an optimal location of a security device and/or to dynamically and automatically create rules for security devices, communication modules, and/or proxy devices, including replacement devices. Intrusion detection and/or prevention can be provided for an system utilizing mechanisms for an industrial protocol space. Automated configurable security rule combining can maintain a rule set that is simple and manageable. Configuration and maintenance of industrial protocol devices, communication devices, security-enabled devices, security proxies, and intrusion detection and/or prevention can be simplified within unique industrial environment architectures.

16 Claims, 10 Drawing Sheets

DISTRIBUTED LEARN MODE FOR CONFIGURING A FIREWALL, SECURITY AUTHORITY, INTRUSION DETECTION/PREVENTION DEVICES, AND THE LIKE

TECHNICAL FIELD

The following description relates generally to industrial systems, and more specifically to security in an industrial environment.

BACKGROUND

Advances in computing technology allow businesses to operate more efficiently when compared to substantially similar businesses only a few years ago. For example, internal networking enables company employees to communicate instantaneously by email, quickly transfer data files to other employees, manipulate data files, share data relevant to a project to reduce duplications in work product, etc. Technological advancements have also enabled factory applications to become partially or completely automated. For example, operations that once required workers to put themselves proximate to heavy machinery and other hazardous conditions can now be completed at a safe distance.

Firewalls are security devices that protect networks from unauthorized access and/or malicious attacks from sources external to the network. Such unauthorized access may be to obtain sensitive information, disrupt the function of a network, or simply accidental and/or unintended access. A traditional firewall divides a network into at least two portions, an internal portion, which is behind the firewall, and an external portion, which is outside the firewall. To protect against unauthorized access, firewalls can inspect various parameters of a data communication(s) and make a determination whether such data communication(s) should be transmitted to the intended destination or whether they should be blocked, dropped or rerouted. However, it is not often apparent where to place such a security device within a network.

Security products, such as firewalls can be configured by providing a rule or set of rules defining what traffic may or may not pass through the firewall. Rules allow or deny specific sources, destination network addresses, ports, and the like to communicate with a device on the other side of the firewall. For an industrial firewall, the rules can be expanded to include industrial protocols (e.g., Common Industrial Protocol (CIP)), routing paths, services, individual objects, attributes, tags, etc. The list of rules can often be large, unwieldy, and difficult to define manually, and at times can be difficult for the user to describe in a manner the firewall protocol understands. If security is not easy to configure, it might not be used or might be set up incorrectly. In addition, after a system change, reconfiguring distributed firewalls can be difficult and, thus, a user may not reconfigure the firewall, leaving the system open to unauthorized access.

Intrusion detection and prevention is another security product that can be utilized to detect unwanted or unexpected traffic. Although intrusion detection devices cannot block traffic, they can detect abnormal traffic and generate an alarm or other notification means. However, intrusion detection and prevention devices are generally not easy to configure nor it is easy to determine where to place such devices in a new and/or existing system.

To overcome the aforementioned as well as other deficiencies what is needed is a technique for rules and/or policies for firewall devices, intrusion detection/prevention devices, and the like to be automatically created and managed. The technique should allow for selective placement of the various devices based on analysis of the entire system that can automatically determine the appropriate location or evaluate a chosen location based on various criteria regarding the devices and/or traffic patterns. A mechanism for acquiring industrial protocol communication information from distributed sources and integrating that information with a single, central system management tool is also needed.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

According to an embodiment is a system for determining placement of a security device. The system includes a collector module that collects traffic information from at least one distributed source during a learn mode. Also included is a context module that places the collected traffic information into a system context. A placement module can determine a location for a security device based in part on the system context and the collected traffic information. In accordance with some embodiments, the system can also include a rule builder module that can analyze the collected traffic information for a target device and identify a source identity and recommend a device for enforcement of access control between the source identity and the target device.

In accordance with another embodiment is a system for automatically applying a security rule to a security device. Included in the system is a learn component and an enforcement component. The learn component places the system into a learn mode during which traffic information and a traffic identity are monitored and recorded for analysis and configures at least one access control rule for a security device. The enforcement component automatically enforces the configured access control rule to a recently installed security device. The access control rule can define an identity allowed to access system and an operation the identity can perform within system or it can be a generalization based on the traffic information.

According to another embodiment is a method for selectively configuring a security device. The method includes collecting traffic information from at least one distributed source and converting the collected traffic information into a system context. A security rule can be created utilizing the system context and the security rule can be automatically applied to a security device. The distributed source can include a security enabled module, a firewall, and/or an intrusion detection device.

According to another embodiment is a method for determining a location for a security device. The method includes obtaining traffic information from a plurality of distributed sources and aggregating the obtained traffic information into a system view. The traffic pattern information is analyzed and a recommended location for the security device is provided.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
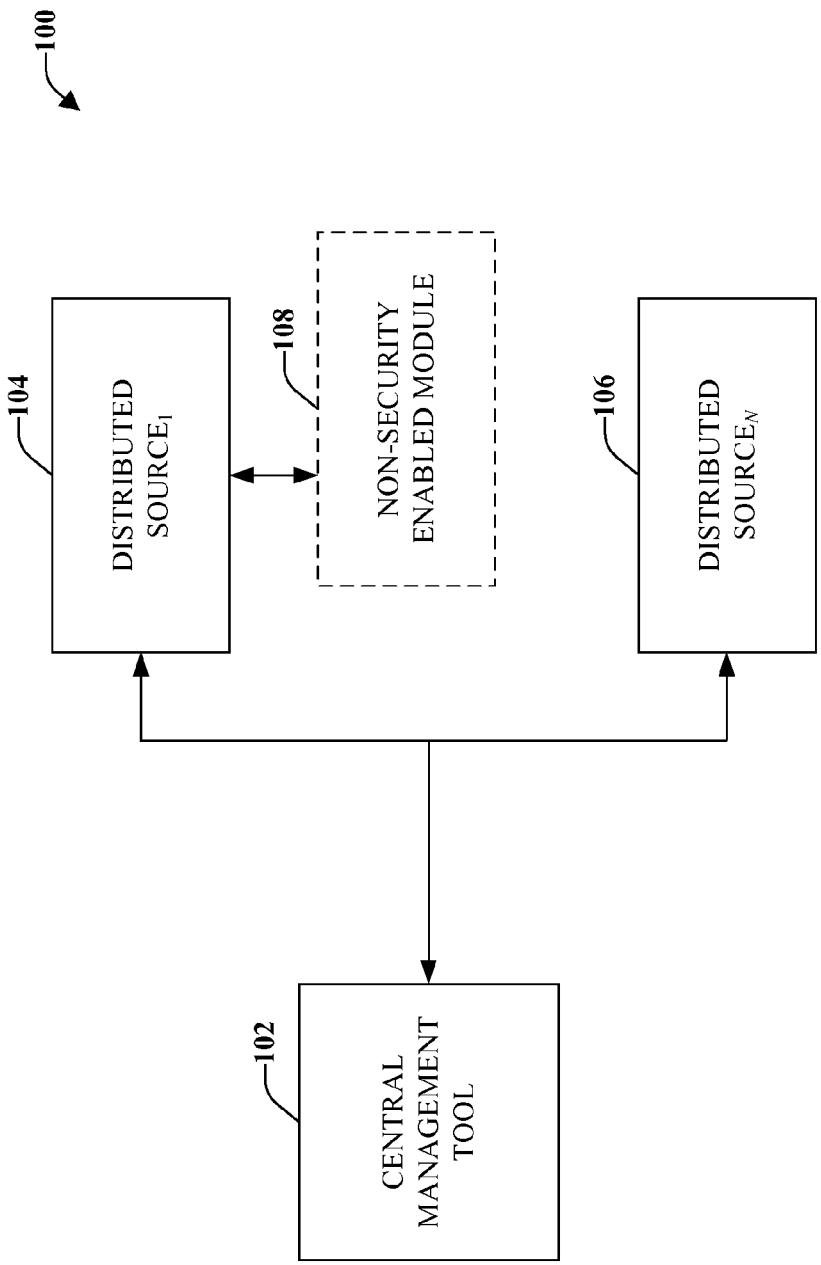
FIG. 1 illustrates a system for placing and/or configuring a security device(s) based on information obtained from distributed sources.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component, "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

Artificial intelligence based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used. The word "exemplary" is used herein to mean serving as an example, instance, or illustration. Any aspect or design described herein as "exemplary" is not necessarily to be construed as preferred or advantageous over other aspects or designs.

Referring initially to FIG. 1, illustrated is a system 100 for placing and/or configuring a security device(s) based on information obtained from distributed sources. System 100 includes a central management tool 102 that interfaces with one or more distributed sources, labeled distributed source$_1$ 104 and distributed source$_N$ 106, where N is an integer greater than or equal to zero. Central management tool 102 can interface with distributed sources 104 and 106 through a wired connection or a wireless connection.

Central management tool 102 can obtain initial information from distributed sources 104 and 106, which can be design parameters or design data. For example, the design information can include information regarding how the source 104, 106 should operate or how the system 100 should operate. The design information can include design documentation, which can be included in a file(s) or a database(s) associated with or separate from each distributed source 104, 106. Such design information can be utilized to generate a list of intended communication paths that should be utilized in system 100. As such, the design information can be utilized to initially determine an optimal location for a security device (e.g., firewall, intrusion detection device, communication device, security authority or other devices that maintain and/or enforce security information). The design information can, alternatively or in addition, be utilized to or to configure or police communication paths in system 100 by only allowing the paths that are known or anticipated by analyzing the design documentation.

By way of example and not limitation, a design data store can be a database or file that includes information regarding which devices are connected, the traffic or communication speed in a network, etc. Such a database or file can be opened and analyzed to retrieve various information. These databases or files can be referred to as off-line data stores because they may not be associated with a physical device but could be information retained in storage associated with a network.

Alternatively or in addition, central management tool 102 can collect data from distributed sources 104 and 106 regarding the traffic or communication received or detected at each device when system 100 is operated with security disabled. Central management tool 102 can collect statistics (e.g., what communication paths have been requested, . . . ) from each source 104 and 106 in system 100. Such statistical information, alone or in combination with the design information, can be utilized to determine an optimal location for one or more security devices and/or to generate a rule for the security device(s). In some embodiments, the data can be collected when security devices are turned off or during a preliminary level of security and the information regarding traffic is obtained from such security devices as well as other distributed sources.

In addition or alternatively, distributed sources 104 and 106 can be security enabled devices or modules (e.g., communication modules) and can be any suitable industrial automation devices. For example, automation devices can be programmable logic controllers (PLCs) or PC-based controllers. PLCs are small computers that are employed for automating real-world processes (e.g., controlling machinery within an industrial environment). Typically, PLCs are microprocessor-based devices with modular or integral input/output (I/O) circuitry, wherein such circuitry is utilized to monitor status of field connected sensor inputs, and is further utilized to control output actuators according to a logic program. It is to be understood, however, that any factory-floor level device that includes adequate processing and/or memory capabilities can be the distributed sources 104 and 106.

According to some embodiments, distributed sources 104 and 106 can be networked devices, an industrial control system or another device utilized in an industrial environment that is configured to communicate with one or more other devices. For example, networked devices can be networked pagers, cellular phones, Personal Digital Assistants (PDAs), or any other suitable electronic devices that can be networked. The automation device or distributed sources 104 and 106 can be networked together utilizing any suitable network, network protocol, etc.

Distributed sources 104 and 106 are not to be limited to conventional devices utilized in industrial environments. For example, the distributed sources 104 and 106 can be personal computers, white boxes, or other suitable devices that can be employed to effectuate a process, and the disclosed embodiments are not intended to be limited to conventional factory-floor automation devices. In accordance with one or more embodiment, EtherNet/IP (EIP) can be employed in connection with providing an automation network, wherein the distributed sources 104 and 106 reside within such network. EIP is a high-level industrial application layer protocol that is utilized in industrial automation environments, and is built upon a standard TCP/IP protocol suite (e.g., conventional Ethernet hardware and software is employed in connection with defining an application layer protocol for configuring, accessing, and controlling industrial automation devices).

System 100 can infer or determine the optimal location to initially place a security device by analyzing the entire system in a "system view." A system view allows the system 100 as a whole to be analyzed from collected data and a determination can be made regarding where to place one or more security devices. Such a determination can be made based on the traffic seen within the system during an analysis period or learn mode. The determination can also be made based on periodic traffic (e.g., traffic seen once a day, once a week, . . . ) that might not have been seen during the analysis period. Such information can be obtained by central management tool 102 based on the design environment or from historical information that a bridge or security authority might have maintained.

In addition or alternatively, system 100 can support automatic device replacement, wherein new or replacement devices are automatically configured. For a specific example, a security device may desirably be replaced by a substantially similar communication device that is not properly configured. Central management tool 102 can ascertain that a replacement security device is not configured by various means, such as sending a communication to the device, receiving a device identification, inferring that the security device is a replacement, a user manually notifying system 100 of the replacement, etc. Thereafter, a known acceptable configuration can be automatically loaded into the replacement device, thus configuring the replacement device with known security parameters.

According to some embodiments, system 100 can include one or more non-communication module(s) or non-security enabled module(s) 108 (e.g., legacy device). For example, a non-security enabled module 108 can be an industrial sensor, a monitoring device, or other industrial devices that do not include security functionality and/or communication functionality. It should be understood that in some embodiments system 100 might not have any non-security enabled module(s) 108.

As illustrated, non-security enabled module 108 interfaces with other devices (e.g., distributed source 106) through communication module 104. In such a manner, distributed source 104 is a proxy or bridge for non-security enabled module 108.

Figure 2:
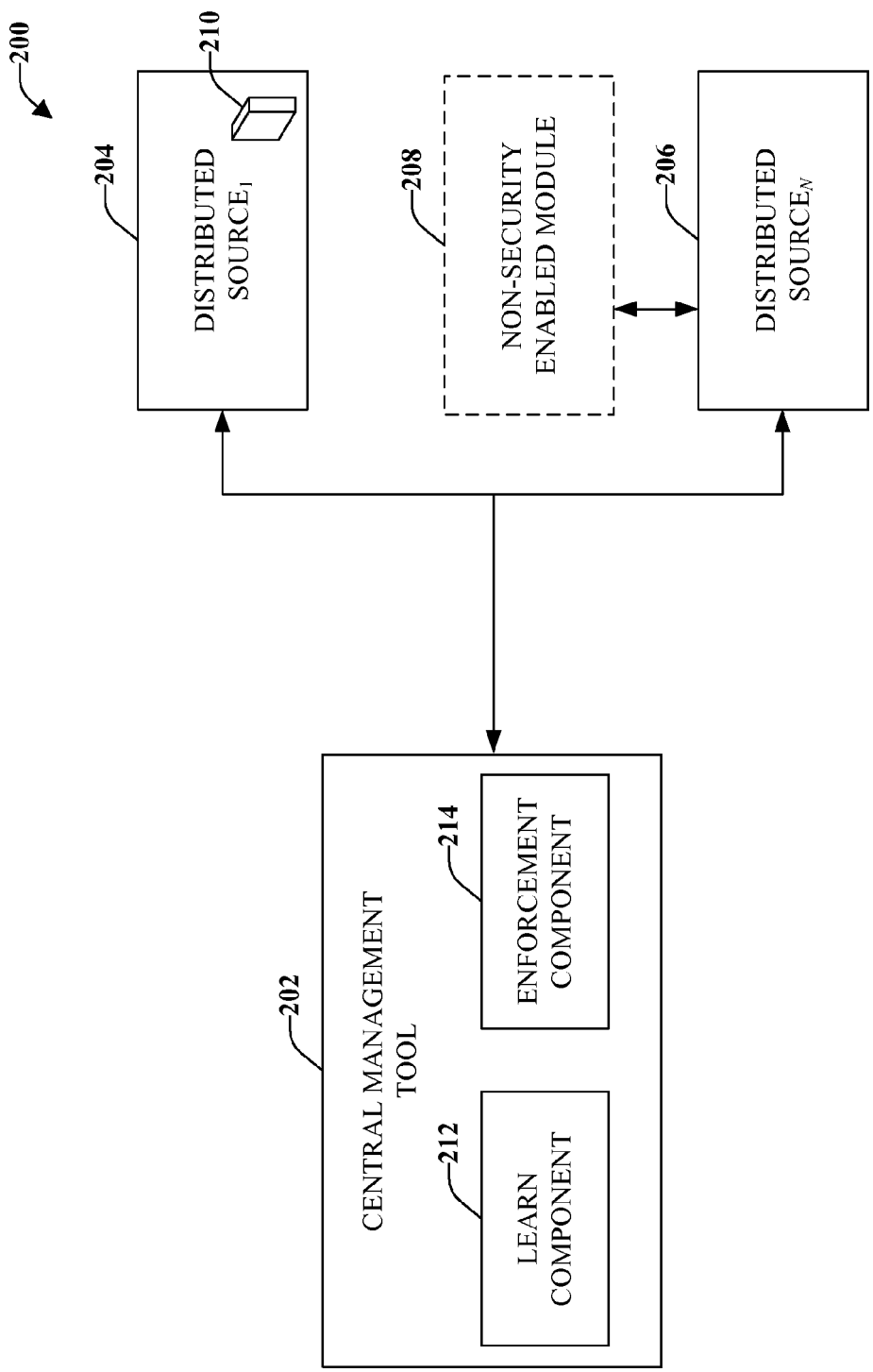
FIG. 2 illustrates another system for automatically determining placement and/or configuration of security device(s) based on information obtained from distributed system sources.

FIG. 2 illustrates another system 200 for automatically determining placement and/or configuration of security device(s) based on information obtained from distributed system sources. System 200 includes a central management tool 202 that interfaces with distributed sources, such as distributed source$_1$ 204 and distributed source$_N$ 206, where N is an integer greater than or equal to zero. According to some embodiments, system can also include one or more non-security enabled module(s) 208 that can be reached or accessed through, for example distributed source 206, or a bridge device that would proxy the security for the non-security enabled module. According to some embodiments, system 200 does not include non-security enabled module(s) 208.

As illustrated, one or more distributed source 204 can include a security device, such as a firewall 210. It should be understood that any system device can have an imbedded firewall and, further, firewall(s) can separate components and can be distributed throughout system 200. Firewall 210 can filter incoming and/or outgoing data, communication or traffic, including a group of data, sent and/or communicated from one device on one side of firewall 210 to another device located on the other side of firewall 210. Firewall 210 technology inspects each packet (incoming traffic), classifies each packet, and performs one or more actions based on such inspection and/or classification. Typical actions are to pass or allow the packet, or block and/or route the packet in a specific manner. Other typical actions can be to log or enunciate invalid and/or unauthorized accesses, such as through an intrusion detection device. Stateful packet filters may also take into account previously seen packets when performing classification. It should be understood that security devices can monitor or reroute both incoming and outgoing traffic.

For example purposes and not limitation, firewall 210 may allow a data sent from a sender (not shown), located on one side of firewall 210, to be transmitted to a distributed source 204 (e.g., recipient) that has an embedded firewall 210 or that is located on the other side of firewall. Data sent that is intended and/or authorized to reach recipient distributed source 204 are relayed or allowed to pass through firewall 210. Data not intended and/or not authorized for such recipient distributed source 204 can be blocked by firewall 210 and not allowed to pass to distributed source 204. Thus, firewall 210 can be configured to detect and/or prevent an unauthorized access.

Central management tool 202 can be configured to acquire industrial protocol communication information from distributed sources 204 and 206 that can be configured to collect and report information regarding communications they may receive and/or send (e.g., traffic information). It should be understood that distributed sources, (e.g., software packages, security device, design data stores, . . . ) through or to which any communications occur can be involved with reporting traffic. The information reported by distributed sources 204 and 206 can be aggregated by central management tool 202 to create firewall rules, security rules, and/or security authority rules, or information for other analysis purposes that might be utilized online or offline.

In some embodiments, the collected information can be utilized to support intrusion detection and/or intrusion prevention. Intrusion detection can be external or internal to system 200. For example, a user in an industrial environment may install a new device that is not recognized by the system 200. This new device can be detected by intrusion detection and a warning provided to a user indicating that there is something potentially dangerous in system 200. The intrusion detection would trigger an alarm, for example, but would not stop the traffic to/from the newly installed device.

Central management tool 202 can be configured to automatically evaluate an environment of system 200 and make a determination of an optimal location for one or more security device (e.g., firewall, intrusion detection device, communication device, security authority or other devices that maintain and/or enforce security information, . . . ). Central management tool 202, in addition or alternatively, can automatically apply, configure, modify, delete, etc. rules and/or policies of a security enabled device allowing for seamless integration of such devices into a new or existing system 200. To perform such functions, central management tool 202 can include a learn component 212 and an enforcement component 214. However, as discussed previously, more or fewer components can be utilized with system 200.

Learn component 212 can be configured to implement or perform a distributed learn or analysis mode within system 200. Distributed source(s) 206, 208 and/or firewall (if one is installed within system), or another security device can collect local traffic information or patterns occurring in system 200 that should be applied to various components or devices within system 200 and/or that can be analyzed to determine a proper location for a security device. The collected information can be transformed into a machine understandable language and can be utilized to create rules for firewall(s), security devices and/or communication devices. In addition or alternatively, learn component 212 can be configured to identify traffic similar in type to the traffic for which rules were received. The received rules can automatically (or manually) be applied to the similar traffic occurring in system 200. Devices (e.g., communication modules, security devices) that are substantially similar in type, functionality, etc., can automatically (or manually) be configured with similar rules. This automated, configurable rule combining can assist in maintaining simple and manageable rule set.

Learn component 212 can be configured to place system 200 into learn mode during which traffic information and a traffic identity are monitored and recorded. Learn component 212 can analyze the traffic identity and configure at least one access control rule for a security device. The access control rule can define an identity that is allowed to access system 200 and can further define one or more operation that the identity can perform within system 200. In accordance with some embodiments, access control rule can be generalized based on the traffic information. For example, system 200 or learn component 212 can acknowledge or notice that two or more identities (e.g., Identity A and Identity B) both should have access during the learn mode. When configuring or applying the access control rule, it is determined that Identity A and Identity B are both included in a subgroup (e.g., Operators). System 200 and/or learn component 212 can define a generalized access control rule whereby "Operators" should have access to a particular device rather than limiting the rule to only Identity A and Identify B.

Additionally, learn component 212 can be configured to observe industrial protocol communications. Such observation can include complete analysis of the communications or observation of selected traffic (e.g., allowed, prevented, . . . ). The analysis can include a comparison of actual traffic patterns to anticipated traffic patterns. Such analysis can be performed when security is not enabled. The observations can be aggregated into a system view, such as a system view configuration tool, that allows a user and/or entity (e.g., another system, a computer, . . . ) to view the entire system in a system context or the entire industrial environment at substantially the same time. Learn component 212 can allow a user(s) to monitor and analyze traffic over the entire system 200. In some embodiments, users can create and deploy new rules, modify existing rules, delete rules, regulate traffic and/or monitor attempted intrusions and/or other system 200 irregularities or suspect behavior.

In accordance with some embodiments, an intrusion detection/prevention device (not shown) can include an intrusion log that tracks or records observed traffic and such an intrusion log can be monitored by learn component 212. It should be noted that an intrusion detection device does not block traffic but simply observes the traffic. If system 200 does not include an intrusion detection/prevention device or if an additional device should be added, central management tool 202, based on its observation of system 200 can infer an optimal location for an intrusion detection system, such as where traffic should be checked based on various criteria, including security parameters of devices within the vicinity.

Enforcement component 214 can be configured to automatically communicate or enforce rules to a recently installed industrial security device (e.g., firewall, intrusion detection, . . . ). At substantially the same time as receiving the rules, the security device can enforce the generated rule, thus providing automatic configuration of such devices. Alternatively or in addition, a user can manually configure a rule through a user interface associated with enforcement component 214. Automatic and/or manual configuration can include preventing central management tool 202 from going into a subsequent learn mode, completely resetting the rules (e.g., revert to a default mode), or other functions to be performed and/or to be prohibited.

Figure 3:
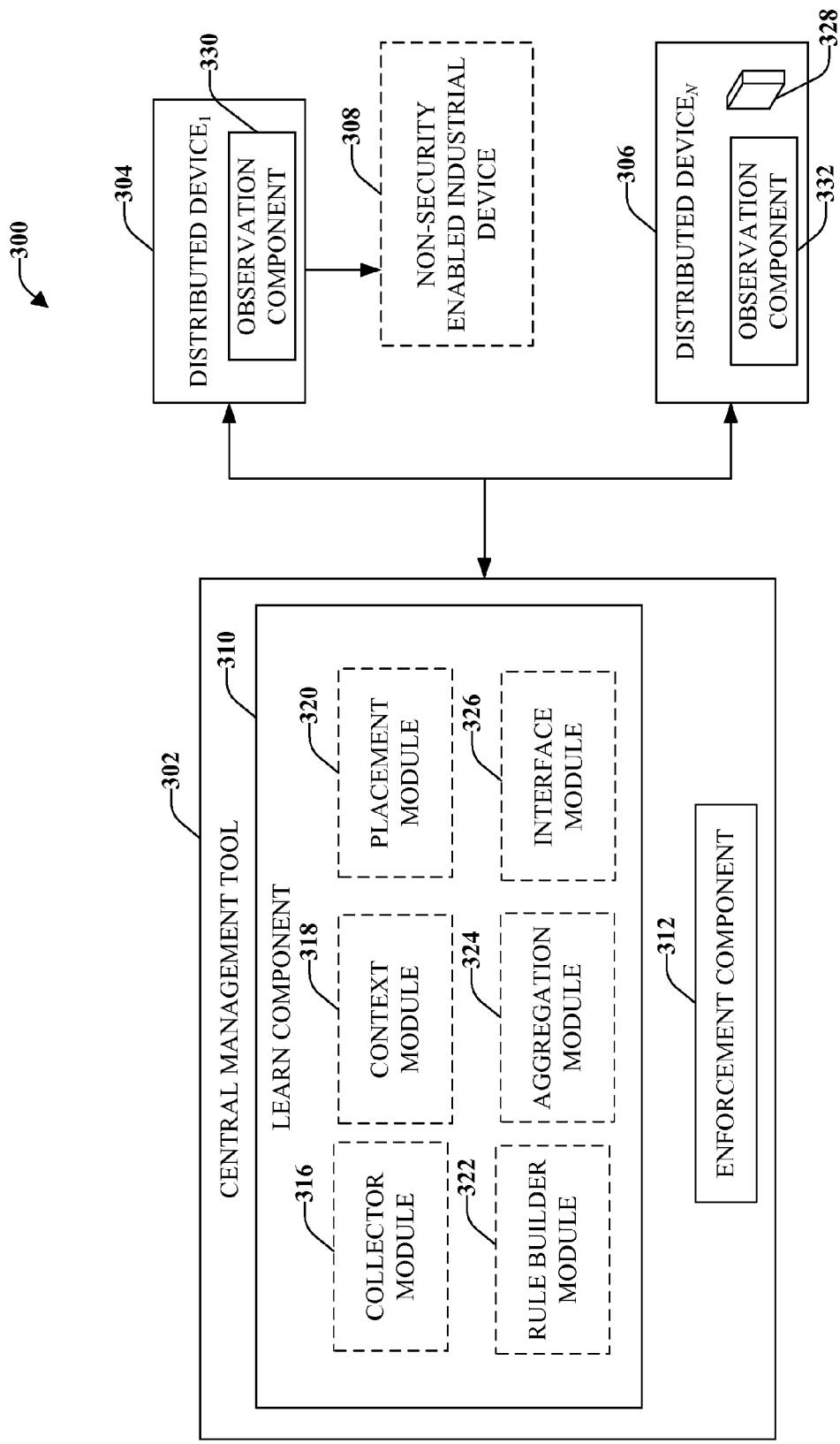
FIG. 3 illustrates a system for utilizing communication traffic to determine a proper location of, or rules for, a security device.

FIG. 3 illustrates a system 300 for utilizing communication traffic to determine a proper location of, or rules for, a security device. Included in system 300 is a central management tool 302 that communicates with one or more distributed device, labeled distributed device$_1$ 304 and distributed device$_N$ 306, where N is an integer greater than or equal to zero. According to some embodiments, central management tool 302 can obtain data from one or more non-security enabled industrial device 308 (e.g., controller, I/O module, server, other modules) that may have access to communication information through, for example industrial device 304, which operates as a bridge to proxy security information for industrial device 308. Central management tool 302 can apply, add, modify, delete, etc. rules and/or policies based on historic or other information provided by non-security enabled device, if one is present in system 300.

Central management tool 302 can be configured to provide system-wide analysis of industrial protocol traffic. For example, central management tool 302 can collect communication information from distributed points in system 300 (e.g., distributed devices 304, 306, and/or 308) when a security rule is not enforced (e.g., traffic is only monitored) or when security rules are partially or fully enforced (e.g., unsecured state, partially secured state, fully secured state) and correlate communication behaviors in system 300. The correlated information can be utilized to determine an optimal location for a security device (e.g., firewall, intrusion detection/prevention, or other security device) and/or to create rules for such devices enabling the devices to be automatically configured.

Central management tool 302 can include a learn component 310 configured to receive, solicit, obtain, etc. information from industrial devices 304, 306, 308 relating to current traffic patterns and/or security rules or policies. Learn component 310 can include various modules including a collector module 316, a context module 318, a placement module 320, a rule builder module 322, an aggregation module 324, and/or an interface module 326. It should be understood that, as discussed above, learn component 310 can include more or fewer modules than those illustrated and described and/or one or more module can be rearranged and/or combined. Learn component 310 can be configured to place system 300 into a learn mode during which system 300 can allow or pass all incoming traffic (no traffic is blocked) while reporting parameters associated with the allowed traffic. In some embodiments, learn component 310 can place system 300 in a partial learn or analysis mode during which one or more security devices applies its configured rules and reports both allowed traffic and blocked traffic.

Collector module 316 can be configured to collect information (e.g., traffic information) from device(s) 304, 306, 308 (e.g., communication module, security enabled module, and the like). For example, collector module 316 can query, poll, receive, etc. information from device(s) 304, 306, and/or 308 periodically or continuously to obtain information regarding communication patterns within system 300. Such information can include the type of communication or traffic received or detected by system 300. In some embodiments, the information can include traffic blocked, traffic rerouted, traffic deleted at substantially the same time as receipt at device 304 and/or 306, traffic between various devices (e.g., some devices may frequently communicate while other devices seldom, if ever, communicate with each other). Collector module 316 can observe and record the information for a pre-determined time, until it is instructed to stop collecting information, or based on other criteria (e.g., a particular event, after a specified number of events or occurrences, . . . ).

Context module 318 can be configured to convert the information from collector module 316 into machine or system understandable language. This information can be placed into a system context, which is a technique to allow a user and/or entity to access system 300. System context provides a definitive view of the entire system and/or a particular configuration or point in system 300 and the expected traffic behaviors at that particular point. The system view knowledge can be utilized by placement module 320 to selectively determine an optimal location for a security device based in part on the system context and the collected information. In addition or alternatively, a type of device (e.g., firewall, intrusion detection, and the like) for a particular location can be determined based on the system view information. The recommended location and/or device type can be communicated to a user and/or entity.

Rule builder module 322 can utilize the system view information to selectively tailor (e.g., create, modify, delete, etc.) rules for firewalls, communication devices and/or a security enabled devices when such devices are inserted at (or moved to) a given point in system 300 or to update system security devices. In addition or alternatively, rule builder module 322 can be configured to observe or seek traffic occurring in system 300 that is of a similar type or that occur frequently between two (or more) devices. Based on this knowledge, rule builder module 322 can combine rules and/or apply similar rules to similar traffic and/or similar devices. In such a manner, similar traffic and/or devices can operate in substantially the same manner. Automated, configurable rule combining can also keep the rule set simple and manageable for a user. Rule builder module 322 can interface with an artificial intelligence component or a rules-based logic component to implement the one or more function of rule builder module 322.

In addition or alternatively, rule builder module 322 can analyze the collected traffic information for a target device, which can be any system device, and identify a source identity (e.g., sender of information). Based on the source identity, the rule builder module 322 can recommend one or more device along the traffic or communication path between the source identity and the target device, wherein the one or more device can enforce an access control rule(s) for the target device. The access control rule(s) can define which entities are allowed access to the system 300 and/or target device and/or which operations those source identities are allowed to perform. The source identity can be a user (e.g., human) whose access is managed by a security authority or it can refer to an association with a physical resource, such as another device whose access is managed by a security authority.

In accordance with some embodiments, interface module 326 can be configured to provide a user the ability to manually refine the rule set and/or policies of the distributed security device(s). For example, the interface module 326 can provide a graphical user interface (GUI), a command line interface, and the like. For example, a GUI can be rendered that provides a user with a region or means to load, import, read, etc. the one or more rules and/or policies and corresponding devices, firewalls, and/or proxies, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with the one or more devices, firewalls, and/or proxies by entering the information into an edit control.

The user can also interact with the regions to select and provide information through various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the disclosed embodiments are not so limited. For example, merely highlighting a check box can initiate information conveyance. In another example, a command line interface can be employed. For example, the command line interface can prompt (e.g., through a text message on a display and an audio tone) the user for information by providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Also included in central management tool 302 can be an enforcement component 312 that can deploy rules to system security devices (not shown) and/or distributed devices 304, 306, 308. Enforcement component 312 can be configured to deploy or distribute the rules and/or policies to a newly installed security device. Enforcement component 312 can maintain a listing of security devices and/or policies utilized in system 300 and/or associated devices. The listing can also include information regarding whether a particular security device is a separate device or integrated on one or more device, such as device 306. This information can be maintained, for example, in memory and/or some other medium that can store information. By way of illustration, and not limitation, central management tool 302 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The newly installed security device, at substantially the same time as receiving the rules and/or policies can start enforcing the generated rules. If the user, through an interface module associated with central management tool 302, modifies the rules and/or policies, interface module 326 can notify rule builder module 322, which can automatically apply such modified (added, deleted, etc.) rules to the security device. In such a manner, system 300 traffic can conform to system 300 generated and/or user-generated modification(s) in a timely fashion.

As illustrated, devices 304 and 306 can include respective observation components 330 and 332 that can be configured to analyze traffic and, for example, compare the actual traffic pattern with an expected traffic pattern though utilization of aggregation module 324 or learn component 310. Observation components 330 and 332, can be configured to observe the traffic pattern in system 300 and report the observed traffic patterns to learn component 310, for example. This observation can include a complete analysis of the entire system 300, particular or segmented portions of system 300, anomalous traffic (e.g., traffic allowed, blocked, rerouted, . . . ), or other subsets or parameters of system 300.

The system-wide or local observations (e.g., from distributed system devices) can be aggregated or correlated into a system view by aggregation module 324. System view allows a user to observe the traffic patterns in a system context. Alternatively or in addition, aggregation module 324 can include off-line functionality that can generate and/or analyze preliminary off-line rules and a decision can be made whether to apply such off-line rules to system 300, or whether a different approach should be taken. In such a manner, the rules might not be applied until the impact of such rules and/or policies to the entire system 300 (or a portion thereof) is ascertained.

Figure 4:
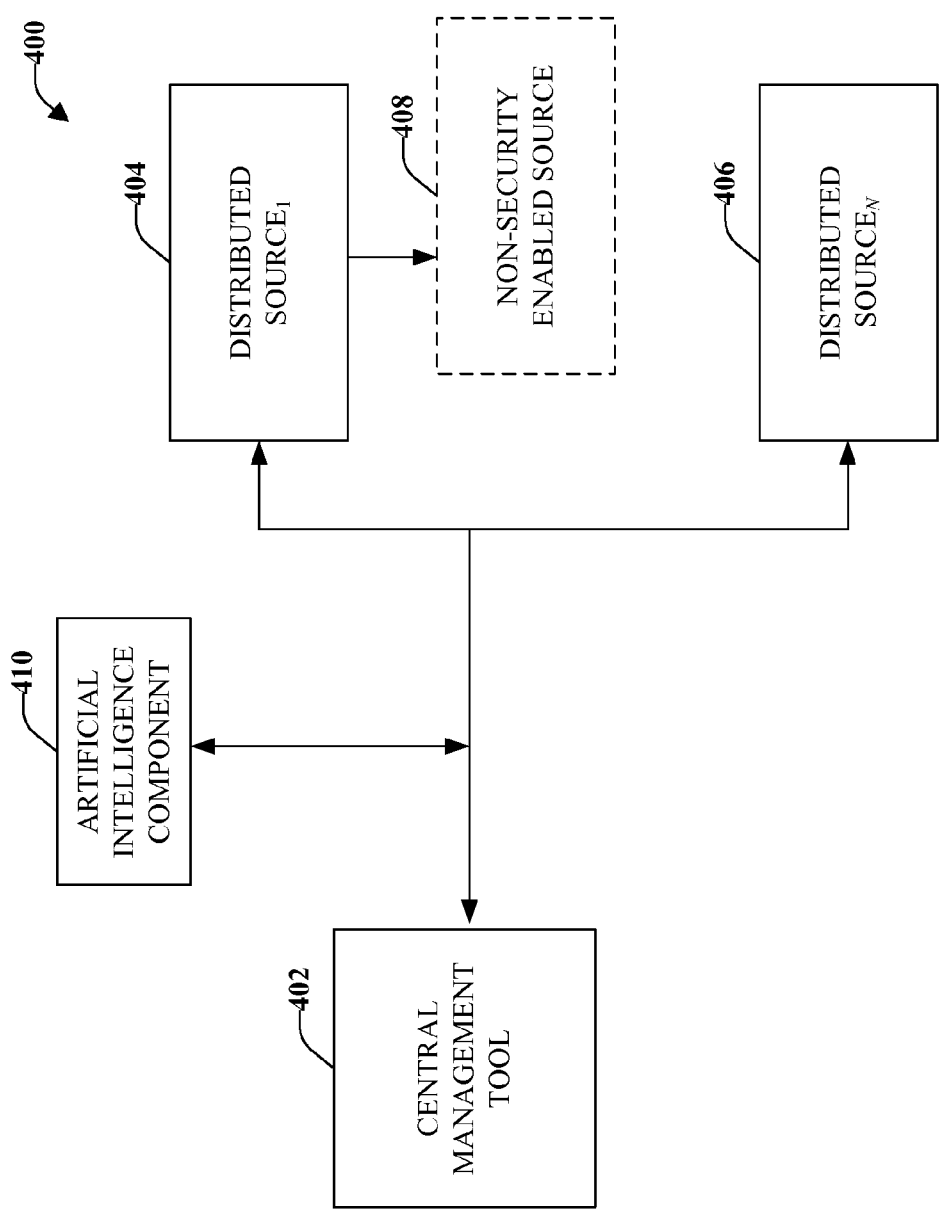
FIG. 4 illustrates a system that employs artificial intelligence that facilitates automating one or more features in accordance with the disclosed embodiments.

FIG. 4 illustrates a system 400 that employs artificial intelligence that facilitates automating one or more features in accordance with the disclosed embodiments. System 400 includes a central management tool 402 that interfaces with at least one distributed source (e.g., distributed source$_1$ 404 and/or distributed source$_N$ 406, where N is an integer greater than or equal to zero) and zero or more non-security enabled source 408. System 400 is similar to the systems described and illustrated with reference to the above figures. Artificial intelligence or machine learning can be effected through artificial intelligence component 410, as illustrated.

The various embodiments (e.g., in connection with inferring a placement of a security device and/or automating configuration of security device(s) in an industrial environment) can employ various artificial intelligence-based schemes for carrying out various aspects thereof. For example, a process for determining if a security device (e.g., firewall, intrusion detection device, . . . ) should be placed at a particular location, if communication should be blocked and/or allowed through firewall 404 can be ascertained through an automatic classifier system and process. Moreover, where multiple communication sources are employed having the same or similar resources, the classifier can be employed to determine which rules and/or policies to employ in a particular situation and/or location.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis rules and/or policies) to prognose or infer an action that a user desires to be automatically performed. In the case of industrial firewalls, for example, rules and/or policies can include industrial protocols, routing paths, services, communication specifics (e.g., destination device, sender device, type of communication), and the classes are categories or areas of interest (e.g., objects, individual attributes, individual tags).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing traffic behavior, receiving extrinsic information). For example, SVM's are configured through a learning or training phase within a classifier constructor and feature selection module. Thus, the classifier(s) can be used to automatically learn and perform a number of functions, including but not limited to determining a proper location for a security device, one or more rule to apply, etc.

Figure 5:
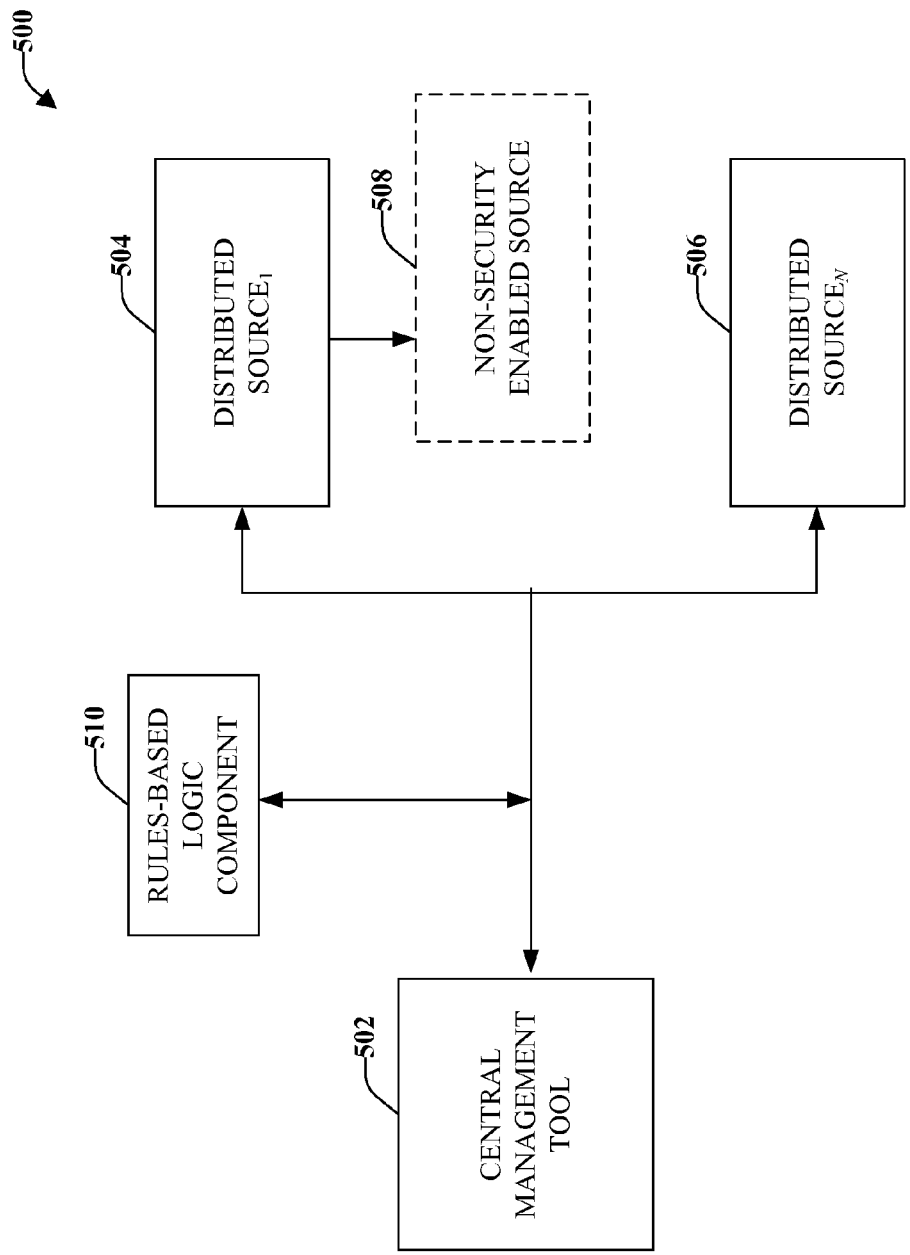
FIG. 5 illustrates a configurable industrial firewall system that employs a rules-based logic component in accordance with the various embodiments presented herein.

With reference now to FIG. 5, illustrated is a configurable industrial firewall system 500 that employs a rules-based logic component in accordance with the various embodiments presented herein. System 500 includes a central management tool 502 that interfaces with at least one distributed source (e.g., distributed source$_1$ 504 and/or distributed source$_N$ 506) and, in some embodiments, can include one or more non-security enabled source 508. System 500 is similar to the systems described and illustrated with reference to the above figures.

More particularly, system 500 can include a rules-based logic component 510. In accordance with this alternate aspect, an implementation scheme (e.g., rule) can be applied to locate, control and/or regulate access to a communication source within system 500. It will be appreciated that the rules-based implementation can automatically and/or dynamically regulate access and authentication based upon a predefined criterion. In response thereto, the rule-based implementation can grant and/or deny access by employing a predefined and/or programmed rule(s) based upon any desired criteria (e.g., data type, data size, data importance, database owner, caller identity . . . ).

By way of example, a user can establish a rule that can require a trustworthy flag and/or certificate to access a predefined type of resource whereas, other resources within a particular system 500 may not require such security credentials. It is to be appreciated that the rules-based logic described with reference to FIG. 5 can be employed in addition to or in place of the artificial intelligence based components described with reference to FIG. 4.

Figure 6:
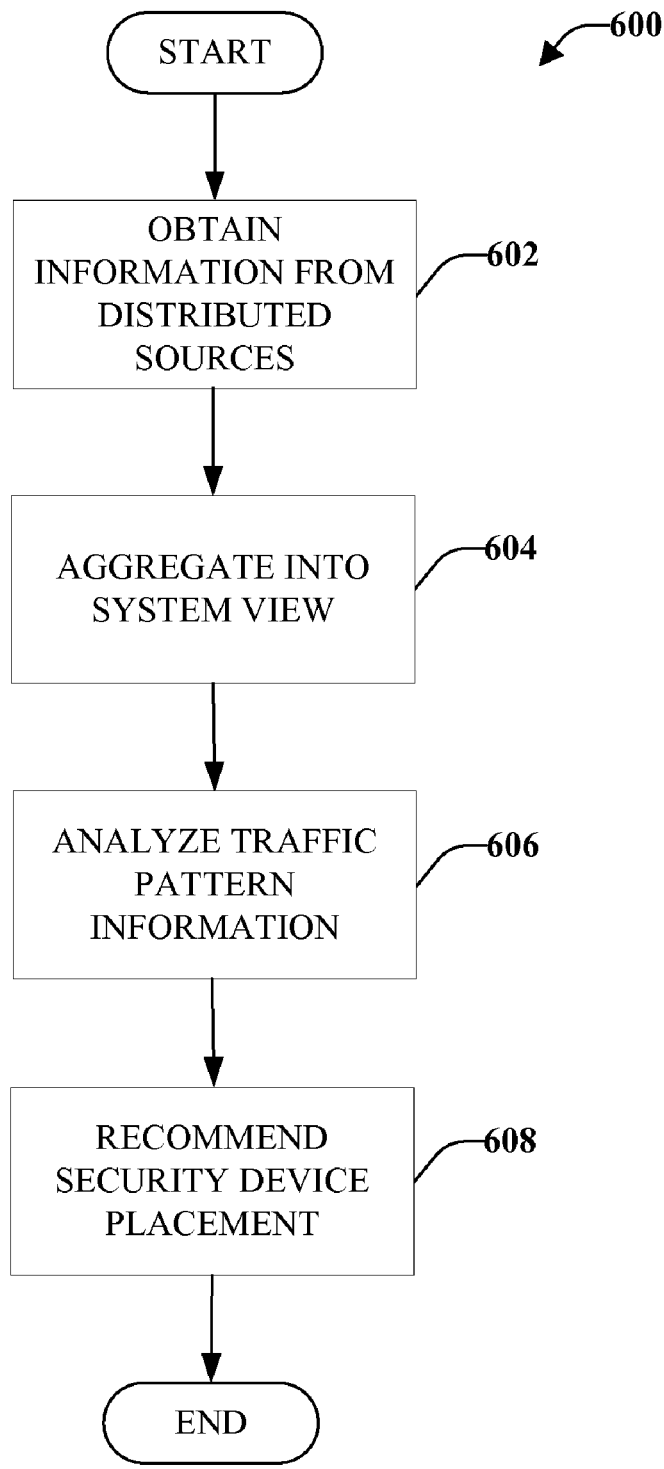
FIG. 6 illustrates a methodology for ascertaining an optimal location of a security device.
Figure 7:
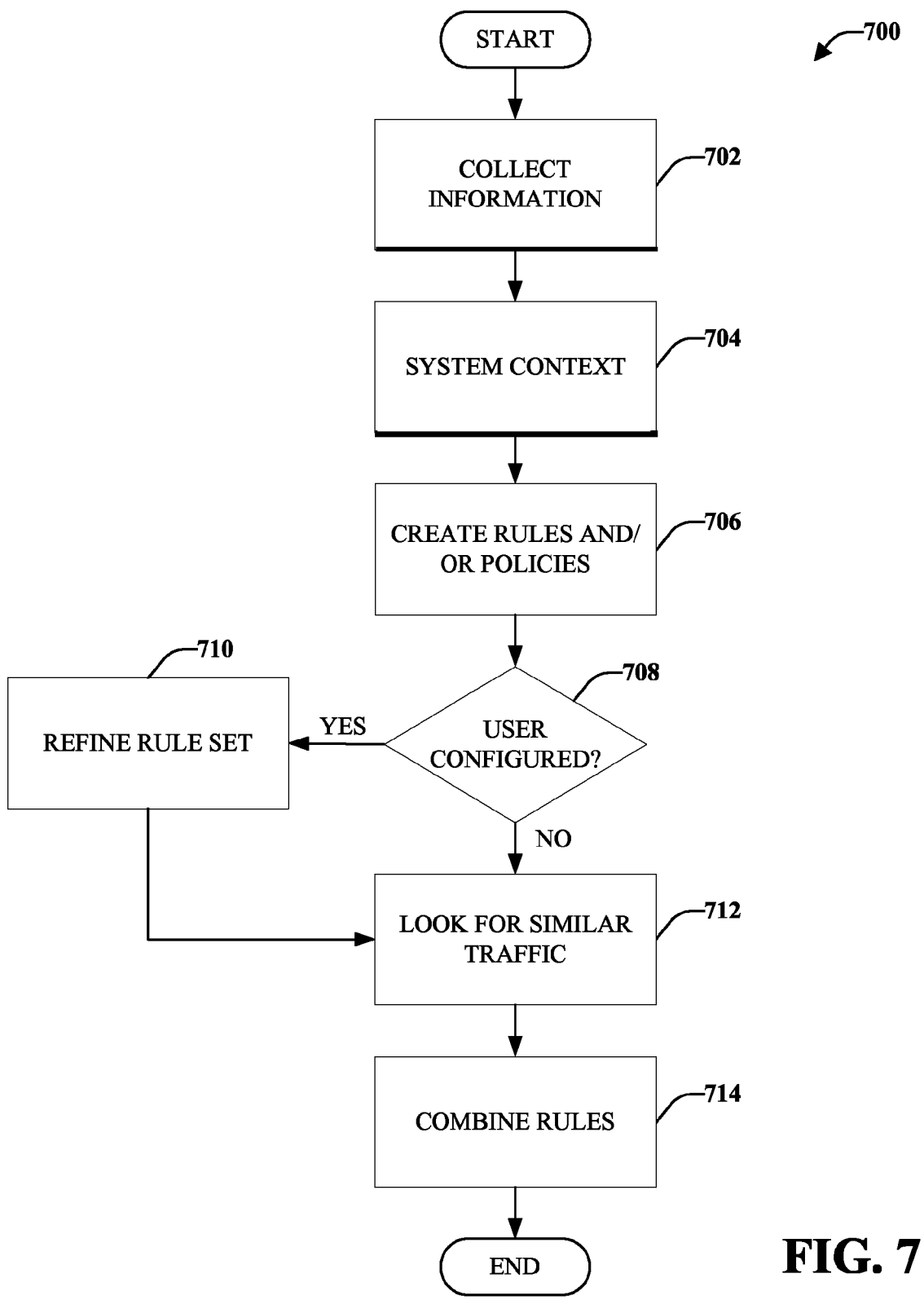
FIG. 7 illustrates a methodology for automatically configuring a security device.
Figure 8:
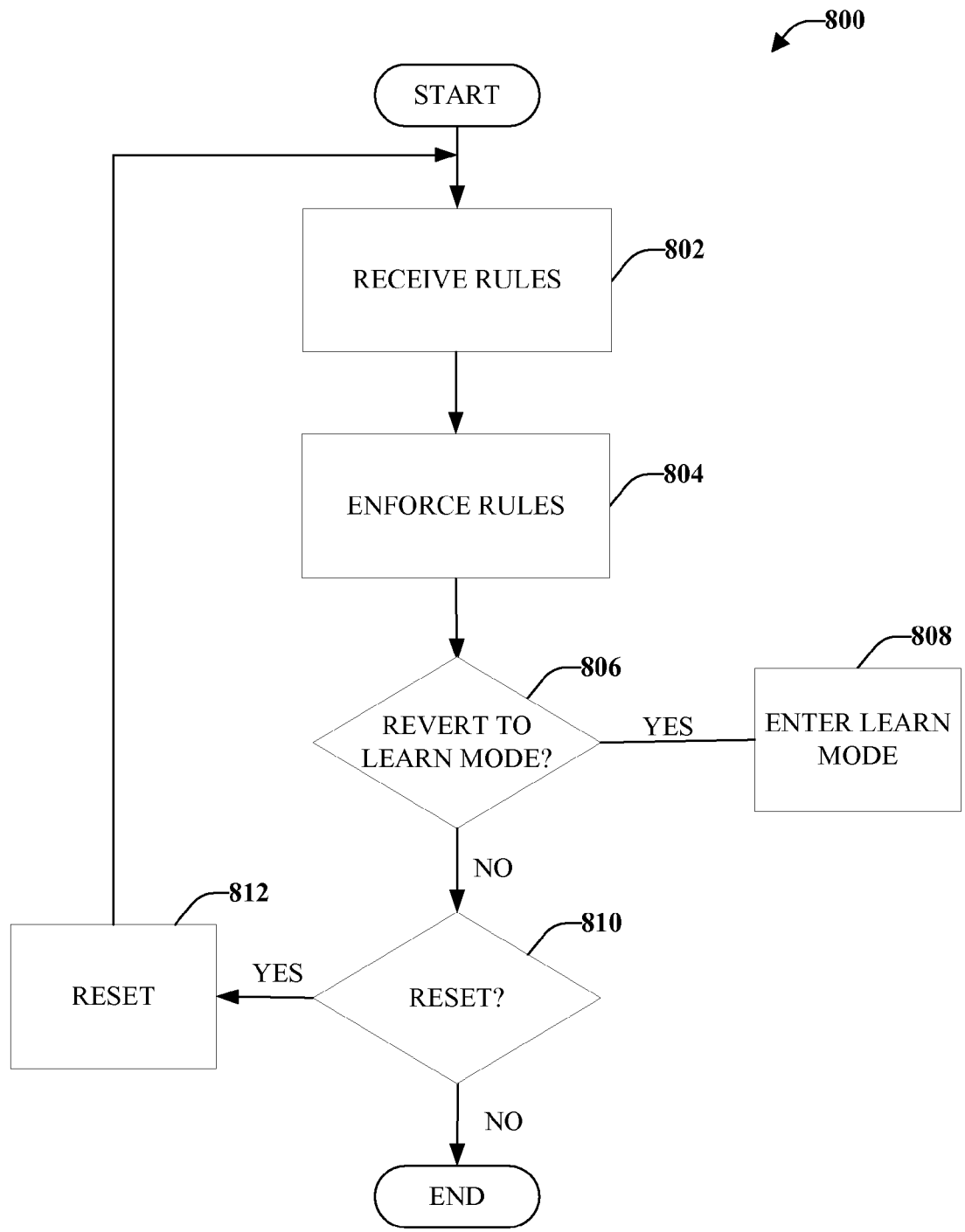
FIG. 8 illustrates a methodology for reverting to an analysis mode or resetting security parameters in an industrial environment.

In view of the exemplary systems shown and described above, methodologies, which may be implemented in accordance with one or more aspects of the various embodiments, will be better appreciated with reference to the diagram of FIGS. 6-8. While, for purposes of simplicity of explanation, the methodologies are shown and described as a series of blocks, it is to be understood and appreciated that the methodologies are not limited by the order of blocks, as some blocks may, in accordance with these methodologies, occur in different orders and/or concurrently with other blocks from that shown and described herein. Moreover, not all illustrated blocks may be required to implement a methodology in accordance with one or more aspects of the disclosed embodiments. It is to be appreciated that the various blocks may be implemented by software, hardware, a combination thereof or any other suitable means (e.g. device, system, process, component) for carrying out the functionality associated with the blocks. It is also to be appreciated that the blocks are merely to illustrate certain aspects presented herein in a simplified form and that these aspects may be illustrated by a lesser and/or greater number of blocks. Moreover, not all illustrated blocks may be required to implement the following methodologies. Those skilled in the art will understand and appreciate that a methodology could alternatively be represented as a series of interrelated states or events, such as in a state diagram.

FIG. 6 illustrates a methodology 600 for ascertaining an optimal location of a security device. Security device can include a firewall, an intrusion detection and/or prevention device, a security authority, and the like. The method begins, at 602, where information relating to anticipated or actual traffic patterns is obtained from distributed sources. Distributed sources can include design data stores or design information. For example, a design data store can be information programmed into a device (e.g., factory default) such as how the device should operate. A design data store can be off-line or not part of a device but rather information retained, for example, in a storage media associated with a network.

Distributed sources, in addition or alternatively, can be various devices distributed in an industrial environment that possess knowledge of traffic information in a network, regardless of whether the devices can communicate the information (provided there is a way to obtain the information though a bridge device). Distributed sources can also include devices that can observe traffic. Such observation can include a complete analysis of the communications or observing only anomalous traffic (e.g., traffic allowed, traffic prevented, . . . ).

The distributed information sources are aggregated into a system view, at 604. The system view provides a user and/or entity with a means to analyze the system as a whole or subcomponents of the system. The traffic pattern information is analyzed at 606 to determine an optimal location for a security device (e.g., intrusion detection prevention, firewall, security authority, and the like). An intrusion detection device might be placed where monitoring traffic patterns would be useful. A firewall might be placed where there is traffic or network cycles that are unsecured and placing a firewall can secure such traffic or network cycles.

At 608, a recommendation of where to place a security device and type of security device can be provided. Such a recommendation can be provided autonomously after analysis of the distributed sources of information. In another embodiment, the recommendations can be maintained in a storage media, for example, and provided when a user and/or entity desires to place a security device in the network. The user and/or entity can request the location (and/or recommended type of device), which can be provided based on the stored information. In another embodiment, the user and/or entity can specify the location or type of device and, based on the stored information a recommendation of whether the location or type of device is a good match for the network can be provided.

FIG. 7 illustrates a methodology 700 for automatically configuring a security device. At 702, information is collected from, for example, one or more information sources (e.g., communication modules, security enabled devices, design data stores, and the like), which can be distributed through a network. The information can also be collected from one or more security devices distributed in the network. The collected information is converted or applied to a system context or view, at 704, which may include transforming the information into machine understandable language. A system context allows a user and/or entity to view a representation of an entire network or a subset of the network. At 706, rules and/or policies are created for use with a security device or firewall utilizing the system context. These rules and/or policies can be automatically applied to the security device at substantially the same time as they are created, or after the impact of such rules and/or policies are ascertained, or at a different time. Rules and/or policies can be created when a firewall and/or other communication device (or non-communication device that can communicate through a proxy) is inserted at (or moved to) an area of a network. These rules and/or policies can be automatically applied without a user and/or entity manually configuring and applying the rules and/or policies. The security rule can be utilized to prevent an unauthorized access attempt.

According to some embodiments, the rules and/or policies can be in human readable form allowing such rules to be presented to one or more user for verification and/or approval. The coverage or scope of rules and/or policies can be edited, modified, deleted, etc. by the user. The modification to the rules and/or policies made by the user can be applied and maintained, without being overwritten automatically by a subsequent learning or analysis mode, for example.

By way of example and not limitation, an industrial device that includes a firewall component or other security device may become defective and need replacement. A user can remove the defective device and install a replacement device. According to the various embodiments disclosed herein, the replacement device can be automatically configured at substantially the same time it is installed, or at any time thereafter. Thus, the user does not have to manually configure the device, saving time (both operator and/or company downtime), frustration, and the potential of the firewall not being properly configured due to a human error.

According to some embodiments, the method 700 continues at 708, where a determination is made whether a user (and/or entity) has configured, refined, redefined, added, deleted, etc. a rule set and/or policy. For example, a user can configure the rules and/or policies to prevent a firewall from returning to a learn mode without specific authority, or to completely reset the rules and/or policies. In addition or alternatively, a user can manually configure some rules that restrict the type of traffic allowed through the firewall even during a learning mode of operation, thus maintaining communication integrity. If the determination at 708 is that the user has configured the rules and/or policies ("YES"), at 710, the rule set (or policies) are refined according to the configured criteria and the method continues, at 712.

If the determination at 708 is that the user has not requested a manual configuration ("NO"), the method 700 continues at 712, where industrial traffic is searched and can be analyzed to find traffic similar to the traffic for which particular rules and/or policies are implemented (e.g., similar type of traffic, similar type of device). If similar traffic (or device) is found, a rule can be created for the similar traffic (or device). The rules for both (or more) devices (e.g., communication module, firewall, proxy, . . . ) are combined, at 714, and can be automatically applied or tailored to the similar traffic and/or devices. A device can be selectively configured in the same manner as a similar device has been configured based on analysis of traffic patterns and device characteristics (e.g., type, function, placement, . . . ).

In the above methodology 700, various acts can be performed by an artificial intelligence (AI) component and/or a rules-based logic component. For example, rules and/or policies can be created, at 706, by AI component and/or rules-based logic component. Further, either or both an AI component or rules-based logic component can look for similar traffic, at 712, and or combine rules, at 714.

FIG. 8 illustrates a methodology 800 for reverting to an analysis mode or resetting security parameters in an industrial environment. Firewall rules and/or policies are received at 802. The rules can be received from a user input or based on an automatic determination of rules that should be applied based on observed and/or analyzed traffic patterns. The rules and/or policies can be automatically applied to a firewall or other security device recently inserted into an industrial environment. For example, distributed firewalls can be moved local to a device or may be inserted as a replacement firewall for one that was recently removed from the environment. At 804, the rules are enforced by the new and/or configured device and/or firewall.

At 806, a determination is made whether to revert to a learn mode by, for example, a user request. If the determination at 806 is to revert to a learn mode ("YES") the method continues at 808 where a learn mode is entered. If the determination at 806 is not to revert to a learn mode ("NO"), the method continues at 810 where a determination is made whether to reset the rules and/or policies associated with a firewall. For example, a user can request a reset to return the firewall security policies to a default rule and/or policy. Thus, the reset can revert the rules and/or policies back to defaults or simply to discard the learn information while maintaining any manually configured rules. If the determination is that the firewall security policies should be reset ("YES") the method 800 continues at 812 with a reset process. The method can then return to 802 where rules are received. If the determination at 810 is not to reset ("NO"), the method can end. In some embodiments, the method 800 can continue at 802, 806 and/or 810 by monitoring for a user input.

Figure 9:
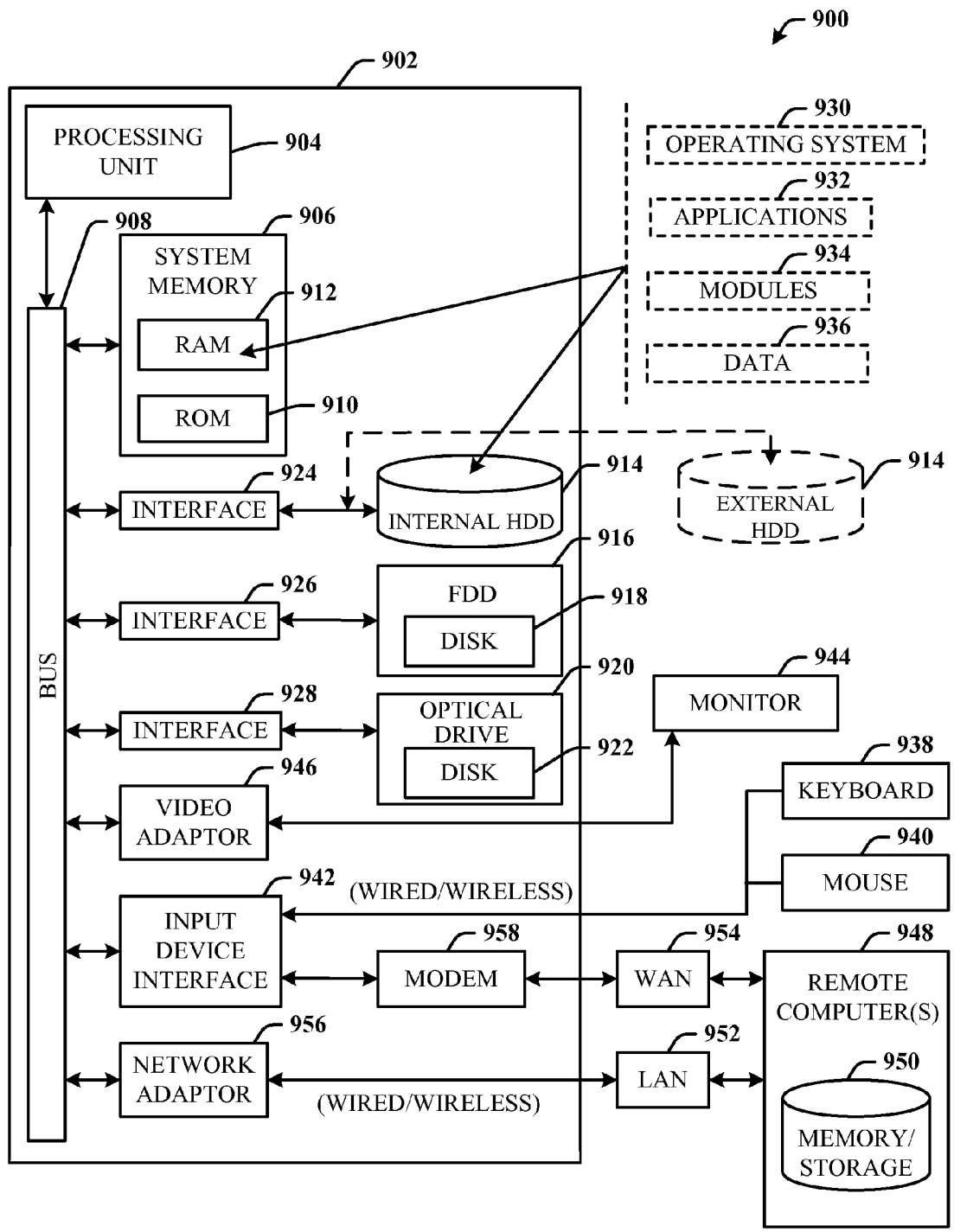
FIG. 9 illustrates a block diagram of a computer operable to execute the disclosed embodiments.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various embodiments can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
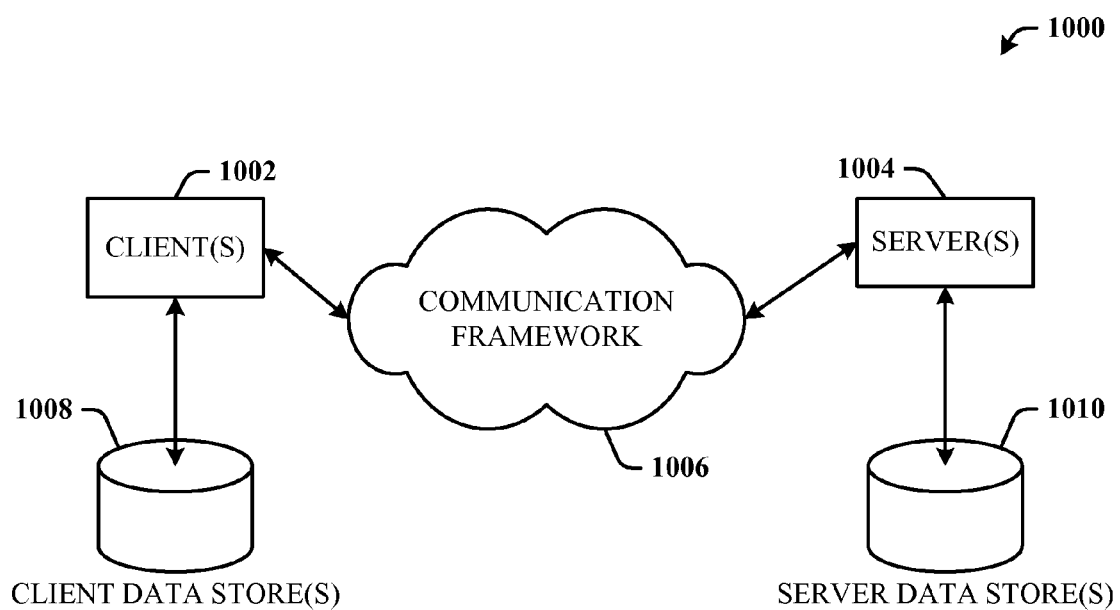
FIG. 10 illustrates a schematic block diagram of an exemplary computing environment operable to execute the disclosed embodiments.

Referring now to FIG. 10, there is illustrated a schematic block diagram of an exemplary computing environment 1000 in accordance with the various embodiments. The system 1000 includes one or more client(s) 1002. The client(s) 1002 can be hardware and/or software (e.g., threads, processes, computing devices). The client(s) 1002 can house cookie(s) and/or associated contextual information by employing the various embodiments, for example.

The system 1000 also includes one or more server(s) 1004. The server(s) 1004 can also be hardware and/or software (e.g., threads, processes, computing devices). The servers 1004 can house threads to perform transformations by employing the various embodiments, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. An apparatus, comprising at least one hardware processor that facilitates implementation of the following computer-executable modules:
    a collector module configured to disable security rules to allow all data traffic across a private factory network employing an industrial protocol to reach a plurality of factory floor level industrial devices in an industrial automation system during a learn mode;
    a context module configured to collect statistical data related to patterns of data traffic incoming to and outgoing from the plurality of factory floor level industrial devices and aggregate the statistical data to provide a plurality of expected traffic behaviors at a plurality of points across the private factory network; and
    a placement module configured to infer at least one of the plurality of points for placement of a security device based at least in part on the plurality of expected traffic behaviors.

2. The apparatus of claim 1, further comprising a rule builder module configured to analyze the statistical data and recommend a device in the industrial automation system to enforce one or more access rules for the plurality of factory floor level industrial devices.

3. The apparatus of claim 1, wherein the collector module is further configured to receive a system traffic pattern from the plurality of factory floor level industrial devices.

4. The apparatus of claim 1, wherein the security device is one of a firewall, a communication device, an intrusion detection device, a security authority, or a device that maintains or enforces security information.

5. The apparatus of claim 4, wherein the firewall is integrated with a communication module.

6. The apparatus of claim 1, wherein the patterns of data traffic are based at least in part on communications received by the plurality of factory floor level industrial devices or sent by the plurality of factory floor level industrial devices.

7. The apparatus of claim 1, further comprising a learn component configured to place the plurality of factory floor level industrial devices in the learn mode to allow all data traffic across the private factory network to reach the plurality of factory floor level industrial devices.

8. The apparatus of claim 7, wherein the learn component is further configured to place the plurality of factory floor level industrial devices in a partial learn mode, wherein security rules are applied to network traffic and allowed network traffic and blocked network traffic are reported.

9. The apparatus of claim 1, wherein the plurality of factory floor level industrial devices includes at least one of a communication module, a security device, an industrial controller or a design data store.

10. The apparatus of claim 1, wherein the patterns of traffic incoming to the plurality of factory floor level industrial devices are based at least in part on at least one identity of at least one apparatus communicating with the plurality of factory floor level industrial devices.

11. A method, comprising:
    employing a hardware processor to execute computer-executable instructions stored in memory to perform acts, comprising:
    disabling security rules to allow all data traffic across a private factory network employing an industrial protocol to reach a plurality of industrial automation devices;
    collecting statistical data related to patterns of data traffic incoming to and outgoing from the plurality of industrial automation devices;
    aggregating the statistical data to provide a plurality of expected traffic behaviors at a plurality of points across the private factory network; and
    inferring at least one of the plurality of points for placement of a security device adapted to enforce security rules based at least in part on the plurality of expected traffic behaviors.

12. The method of claim 11, wherein the acts further comprise:
    creating at least one security rule for the plurality of industrial automation devices based at least in part on the patterns of data traffic; and
    implementing the at least one security rule at the security device.

13. The method of claim 11, wherein the inferring further comprises analyzing the plurality of expected traffic behaviors.

14. The method of claim 13, wherein the plurality of expected traffic behaviors include at least one of traffic blocked, traffic rerouted or traffic deleted.

15. The method of claim 13, wherein the analyzing further comprises comparing the plurality of expected traffic behaviors to a plurality of actual traffic patterns.

16. The method of claim 11, wherein the plurality of expected traffic behaviors include information related to communication between the plurality of industrial automation devices.

* * * * *